(12) United States Patent  
Sonetaka et al.

(10) Patent No.: US 8,040,578 B2  
(45) Date of Patent: Oct. 18, 2011

(54) IMAGE READING APPARATUS AND IMAGE FORMING APPARATUS

(75) Inventors: Kazuharu Sonetaka, Osaka (JP); Kazuhito Takaoka, Osaka (JP)

(73) Assignee: Kyocera Mita Corporation (JP)

( * ) Notice: Subject to any disclaimer, the term of this patent is extended or adjusted under 35 U.S.C. 154(b) by 527 days.

(21) Appl. No.: 12/233,183

(22) Filed: Sep. 18, 2008

(65) Prior Publication Data

US 2009/0086288 A1  Apr. 2, 2009

(30) Foreign Application Priority Data

Sep. 28, 2007  (JP) ................................. 2007-254752

(51) Int. Cl.  
*H04N 1/04* (2006.01)  
*H04N 1/38* (2006.01)  
(52) U.S. Cl. .................. 358/498; 358/486; 358/464  
(58) Field of Classification Search ............. 358/486  
See application file for complete search history.

(56) References Cited

U.S. PATENT DOCUMENTS

| | | | |
|---|---|---|---|
| 5,138,674 A * | 8/1992 | Sugawa | 382/172 |
| 6,795,160 B2 | 9/2004 | Fukusaka | |
| 7,248,378 B2 | 7/2007 | Shiraishi | |
| 2004/0001187 A1 | 1/2004 | Fukusaka | |
| 2006/0204270 A1* | 9/2006 | Abe | 399/82 |
| 2006/0227390 A1* | 10/2006 | Mochimaru et al. | 358/498 |

FOREIGN PATENT DOCUMENTS

| | | |
|---|---|---|
| CN | 1261754 A | 8/2000 |
| CN | 1471039 A | 1/2004 |
| JP | 2001-143050 | 5/2001 |
| JP | 2004015299 | 1/2004 |
| JP | 2007-82033 | * 3/2007 |
| JP | 2008-72753 | 3/2008 |

* cited by examiner

*Primary Examiner* — Twyler Haskins  
*Assistant Examiner* — Helen Q Zong  
(74) *Attorney, Agent, or Firm* — Gerald E. Hespos; Michael J. Porco

(57) ABSTRACT

There are provided: a document feeding section for conveying a document; a first reading section for reading at least one side of the document conveyed by the document feeding section; a second reading section for reading other side of the document conveyed by the document feeding section; and a blank determining portion for determining whether the other side of the document is blank in accordance with image data of the document read by the second reading section. In a case where the blank determining portion determines that the other side is blank, one side of the document is read by the first reading section, and thereafter the document feeding section discharges the document.

13 Claims, 6 Drawing Sheets

IMAGE READING APPARATUS AND IMAGE FORMING APPARATUS

BACKGROUND OF THE INVENTION

1. Field of the Invention

The present invention relates to an image reading apparatus capable of reading both sides of a document, and an image forming apparatus provided with the image reading apparatus.

2. Description of the Related Art

Conventionally, in image forming apparatuses such as a copying machine and a facsimile machine, front and back sides of a document is automatically read by an image reading apparatus provided with an automatic document feeding device (ADF: Automatic Document Feeder). In this document reading, there has been widely adopted a method of reading an image on a front side of a document with an image sensor, reversing the document front and back, and then reading an image on a back side of the document again with the image sensor.

Japanese Patent Unexamined Publication No. 2004-15299 discloses an apparatus which is capable of setting any one of a double-sided simultaneous-reading mode and a double-sided reverse reading mode. In the double-sided simultaneous-reading mode, a minification optical system image sensor provided on a side of an apparatus main body reads one side of a document, and a contact-type optical system image sensor provided on a side of an automatic document feeding device reads the other side of the document, and the both sides of the document are read substantially simultaneously by one document conveyance (one-path) without reversing the document. In the double-sided reverse reading mode, a document read by the minification optical system image sensor is reversed and read again by the minification optical system image sensor.

However, according to the apparatus disclosed in Japanese Patent Unexamined Publication No. 2004-15299, in a case where the double-sided reverse reading mode is set, the document is reversed and a back side is read by the minification optical system image sensor even if the back side is blank, so that a problem of a time loss occurs. Further, at a time of reading a document stack successively, in a case where the document stack includes a large number of documents being blank on their back sides, the time loss becomes excessively large.

SUMMARY OF THE INVENTION

An object of the present invention is to provide an image reading apparatus and an image forming apparatus capable of reducing the time loss in reading a document in a case where the double-sided reverse reading mode is set, and achieving a high-speed reading.

An image reading apparatus in accordance with an aspect of the present invention includes: a document feeding section for conveying a document; a first reading section for reading at least one side of the document conveyed by the document feeding section; a second reading section for reading the other side of the document conveyed by the document feeding section; and a blank determining portion for determining whether the other side of the document is blank in accordance with image data of the document read by the second reading section. In a case where the blank determining portion determines that the other side is blank, one side of the document is read by the first reading section, and thereafter the document is discharged by the document feeding section.

These and other objects, features and advantages of the present invention will become more apparent upon reading of the following detailed description along with the accompanied drawings.

DETAILED DESCRIPTION OF THE PREFERRED EMBODIMENTS

The invention is now described, by way of example, with reference to the accompanying drawings.

First Embodiment

Hereinafter, an image reading apparatus and an image forming apparatus in accordance with a first embodiment of the present invention will be described with reference to the drawings. In the first embodiment described herebelow, an image reading apparatus and an image forming apparatus in accordance with the present invention will be described in a form of a complex machine 1 having functions of a color copying machine, a scanner, a facsimile machine, and a printer.

Figure 1:
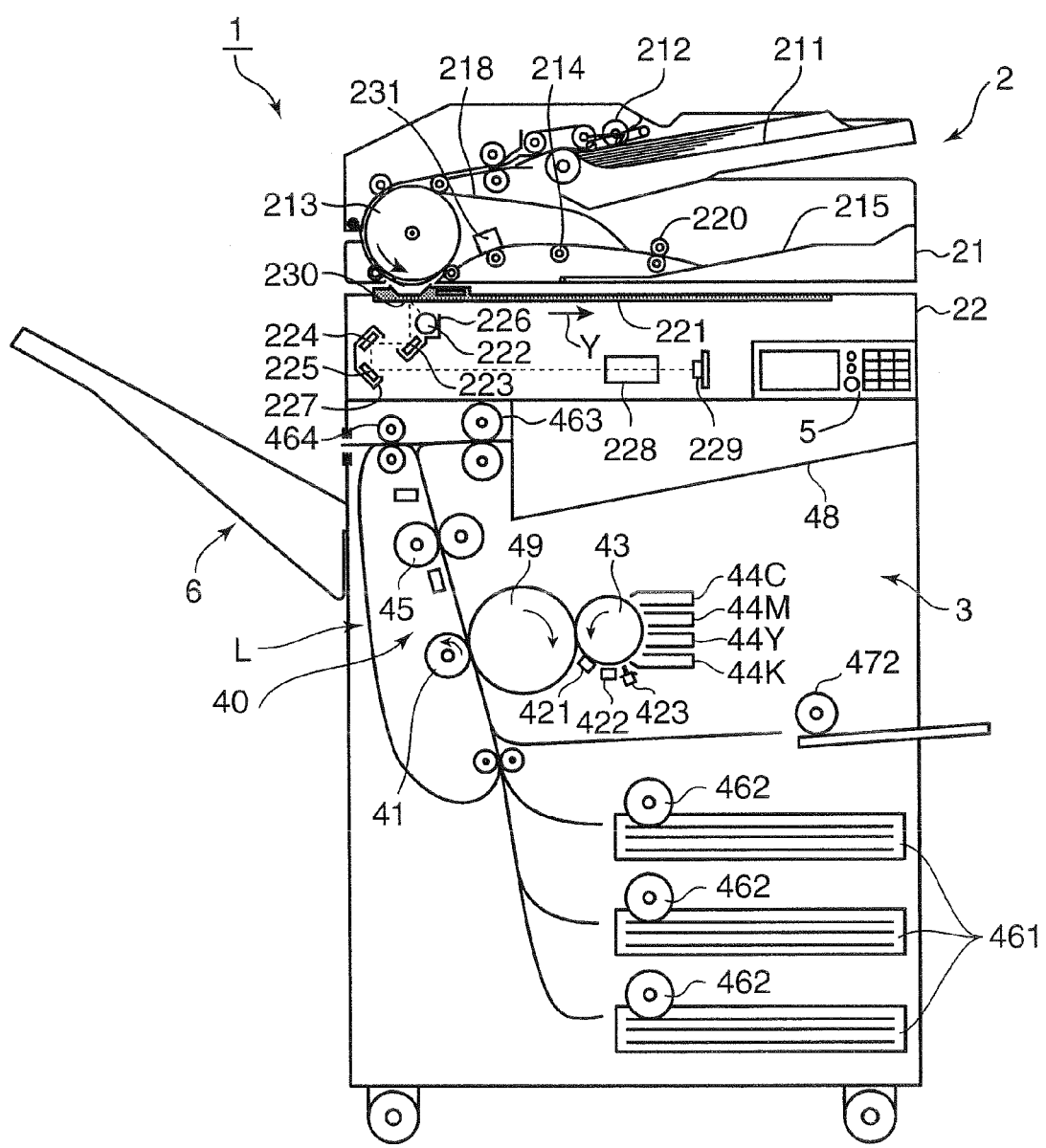
FIG. 1 is a vertical sectional view schematically showing an internal configuration of a complex machine in accordance with a first embodiment.

FIG. 1 is a vertical sectional view schematically showing an internal configuration of the complex machine 1. The complex machine 1 mainly includes an image reading apparatus 2 and an apparatus main body 3. The image reading apparatus 2 includes a document feeding section 21 (refer to FIG. 3), a scanner section 23 as a first reading section (refer to FIG. 3), a CIS 231 as a second reading section, an operating section 5, a sheet-discharging mechanism which will be described hereinafter, and a controller 61 (refer to FIG. 3). The document feeding section 21 is provided with an ADF (Automatic Document Feeder) and includes a document tray 211 as a document holding portion, a pickup roller 212, a conveying drum 213, a sheet-discharging roller 214, and a sheet-discharging tray 215. On the document tray 211, a document subjected to reading is placed. The document placed on the document tray 211 is taken one after another by the pickup roller 212 and conveyed to the conveying drum 213. The document which passes through the conveying drum 213 is discharged to the sheet-discharging tray 215 by sheet-discharging rollers 214, 220.

Figure 3:
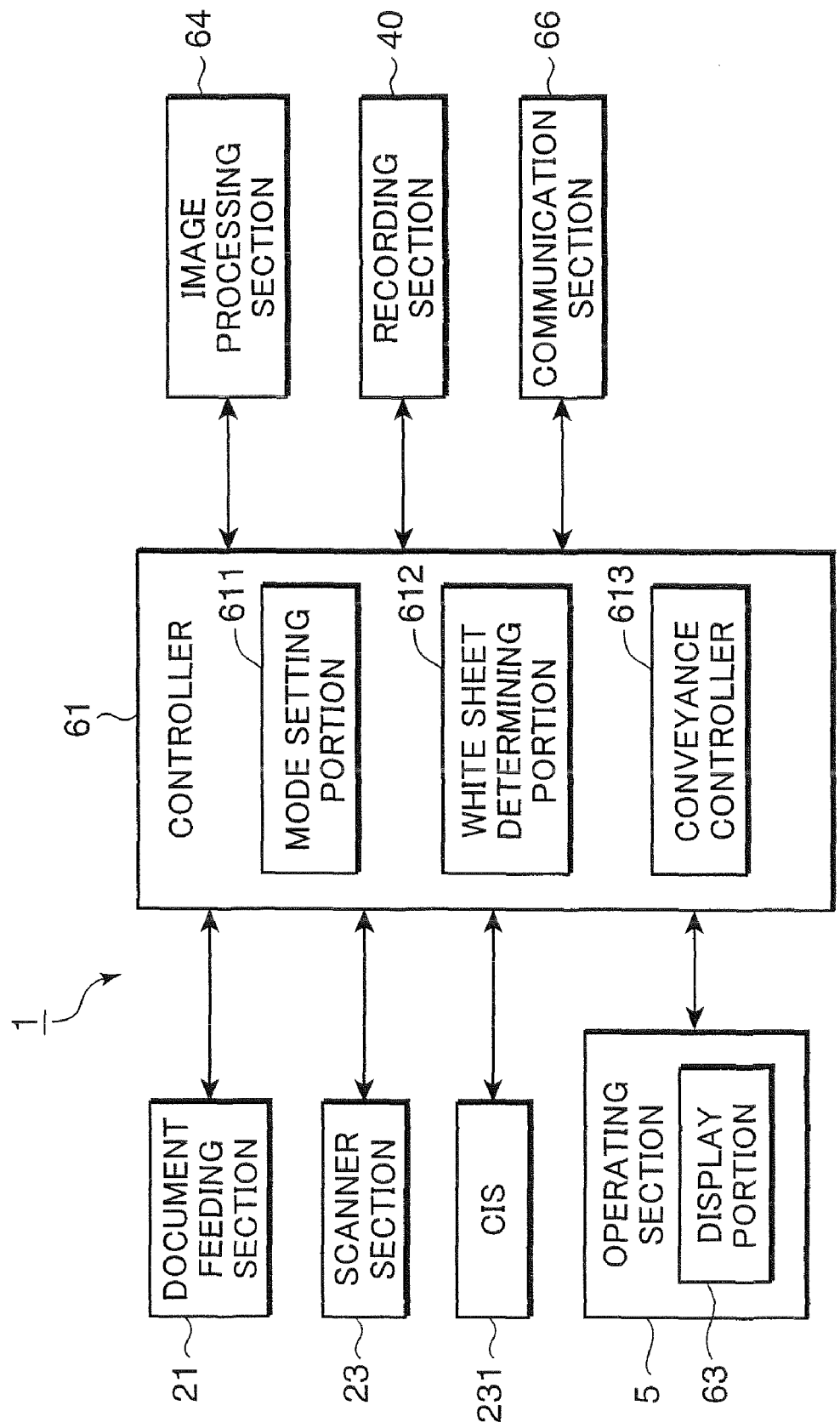
FIG. 3 is a block diagram showing an electric configuration of the complex machine.

The scanner section 23 shown in FIG. 3 is configured by a minification optical system image sensor, and reads an image of the document optically and generates image data. As shown in FIG. 1, the scanner section 23 includes a platen glass 221, a light source 222, a first mirror 223, a second mirror 224, a third mirror 225, a first carriage 226, a second carriage 227, an imaging lens 228, and a CCD (Charge Coupled Device) 229. As the light source 222 of the scanner section 23, for example, a white fluorescent lamp such as a cold cathode fluorescent tube may be adopted. The first mirror 223, the second mirror 224, the third mirror 225, the first carriage 226, the second carriage 227, and the imaging lens 228 guide the light from the document to the CCD 229. The white fluorescent lamp such as the cold cathode fluorescent tube is used as the light source 222 in the scanner section 23. Therefore, the scanner section 23 has a better color reproductivity as compared to the CIS 231 using a three-colored LED as a light source and will be described hereinafter.

On the platen glass 221, a document is placed in a flat-bed reading mode which will be described hereinafter. The light source 222 and the first mirror 223 are supported by the first carriage 226, and the second mirror 224 and the third mirror 225 are supported by the second carriage 227.

The image reading apparatus 2 has document-reading methods including a flat-bed reading mode, in which the scanner section 23 reads a document placed on the platen glass 221, and an ADF reading mode, in which a document is taken in by the document feeding section 21 (ADF) and read while being conveyed. In the flat-bed reading mode, the light source 222 irradiates a light to the document placed on the platen glass 221, and a reflected light for one line in a main scanning direction is reflected sequentially by the first mirror 223, the second mirror 224, and the third mirror 225 and enters the imaging lens 228. The light incident to the imaging lens 228 is imaged on a receiving surface of the CCD 229. The CCD 229 is a one-dimensional image sensor and processes one line of a document image simultaneously. The first carriage 226 and the second carriage 227 are so configured as to be movable in a direction orthogonal to the main scanning direction (sub-scanning direction, the direction of an arrow Y). After reading for one line is terminated, the first carriage 226 and the second carriage 227 move in the sub-scanning direction, and next reading for one line is performed by the CCD 229.

In the ADF reading mode, the document feeding section 21 takes in a document placed on the document tray 211 one after another with the pickup roller 212. At this time, the first carriage 226 and the second carriage 227 are arranged at positions under a reading window 230. In the ADF reading mode, when the document passes through the reading window 230 formed in the document conveying passage extending from the conveying drum 213 to the discharging tray 215, the light source 222 irradiates a light to the document. Then, the reflected light for one line in the main scanning direction is reflected sequentially by the first mirror 223, the second mirror 224, and the third mirror 225, and enters the imaging lens 228.

Further, the document feeding section 21 includes a sheet-discharging mechanism configured by the sheet-discharging roller 220 and the reversing conveying passage 218. The sheet-discharging mechanism reverses front and back of the document whose front side as one side is read by the first ADF reading and conveys the document again to the reading window 230, and the CCD 229 reads a back side as the other side of the document. The document whose back side is read by the CCD 229 passes through the conveying drum 213, and thereafter is discharged to the sheet-discharging tray 215 by the sheet-discharging rollers 214, 220. In the double-sided reading, the document whose front side is read passes through the conveying drum 213, and thereafter is conveyed to the reverse conveying passage 218 by the reversely rotated sheet-discharging roller 220 and then is fed again to the conveying drum 213. Hereinafter, the mode of reading both sides of a document with the sheet-discharging mechanism is named as a double-sided reverse reading mode or a high image quality mode.

Further, in the ADF reading mode, the image reading apparatus 2 in accordance with the present embodiment is capable of allowing the CCD 229 to read a front side of the document while the document is conveyed, and simultaneously allowing the CIS 231 to read a back side of the document, as described above. In this case, the front side of the document conveyed from the document tray 211 by the document feeding section 21 is read by the CCD 229 when the document passes through the reading window 230, and the back side is read when the document passes through the CIS 231. In the CIS 231, a three-colored LED of RGB is used as a light source. By using the CCD 229 and the CIS 231 as described above, both sides of the document can be read just by conveying the document from the document tray 211 to the sheet-discharging tray 215 for one time. In other words, both sides of the document can be read by one path. Hereinafter, the mode of reading both sides of the document with the CCD 229 and the CIS 231 will be named as a double-sided simultaneous-reading mode or a high-speed mode.

The double-sided reverse reading mode (high image quality mode) and the double-sided simultaneous-reading mode (high-speed mode) will be described. In the double-sided reverse reading mode, the double-sided document reading is performed by the same image sensor (CCD 229). Therefore, even if the double-sided printing is performed in accordance with obtained image data, there is no difference in image quality between both sides. However, in the double-sided simultaneous-reading mode, the front side of the document is read by the CCD 229, and the back side is read by the CIS 231, i.e. the reading for front and back sides is performed with different image sensors. Therefore, especially in the case of a color document, if the double-sided printing is performed in accordance with image data obtained respectively by the respective image sensors, image quality of print images on both sides becomes different. It is thought that such difference in image quality occurs because the difference in spectral distribution of the white fluorescent lamp as the light source 222 of the CCD 229 and that of the three-colored LED of RGB as the light source of the CIS 231. Further, since the CCD 229 is configured as an image sensor in which a plurality of light receiving elements are formed on one chip, and on the other hand, the CIS 231 is configured as an image sensor in which a plurality of solid imaging devices are connected, sensitivity becomes irregular between solid imaging devices in the CIS 231.

Thus, in the complex machine 1 in accordance with the present embodiment, for the purpose of solving occurrence of the difference in image quality between print images on both sides, it is so configured that a user can select one of the double-sided reverse-reading mode (high image quality mode) and the double-sided simultaneous-reading mode (high-speed mode) when the double-sided document reading is performed with the ADF reading mode. In other words, a user can select a mode according to a situation by selecting the double-sided reverse-reading mode (high image quality mode) in a case where a user would like to have equal image quality of print images on both sides, or selecting the double-sided simultaneous-reading mode (high-speed mode) in a case where a user would like to prioritize shortening of a reading time even if the image quality differs in print images on both sides.

Further, the complex machine 1 includes an apparatus main body 3 and a stack tray 6 provided on a left side of the apparatus main body 3. The apparatus main body 3 includes a plurality of sheet-feeding cassettes 461, sheet-feeding rollers 462 for conveying recording sheets one after another from the sheet-feeding cassette 461 to the recording section 40, and a recording section 40 for forming an image onto the recording sheets conveyed from the sheet-feeding cassettes 461.

The recording section 40 includes a charge-removing device 421 for removing remaining electric charge from a surface of the photoconductive drum 43, a charging device 422 for charging the surface of the photoconductive drum 43 after removal of electric charge, an exposure device 423 for outputting laser light in accordance with image data obtained in the scanner section 22 for exposure of the surface of the photoconductive drum 43 to form an electrostatic latent image on the surface of the photoconductive drum 43, developing devices 44K, 44Y, 44M, and 44C for forming toner images of cyan (C), magenta (M), yellow (Y), and black (K) onto the photoconductive drum 43 in accordance with the electrostatic latent image, a transfer drum 49 onto which the toner images of respective colors formed on the photoconductive drum 43 are transferred and superimposed, a transferring device 41 for transferring the toner image formed on the transfer drum 49 to the sheet, and a fixing device 45 for heating the sheet, onto which the toner image is transferred, to fix the toner image. The toners of respective colors of cyan, magenta, yellow, and black are supplied from an unillustrated toner-supply container (toner cartridge). Further, in the apparatus main body 3, there are provided conveying rollers 463 and 464 for conveying the recording sheet passed through the recording section 40 to the stack tray 6 or the sheet-discharging tray 48.

In a case of forming images on both sides of a recording sheet, an image is formed on one side of the recording sheet in the recording section 40, and thereafter the recording sheet is nipped between the conveying rollers 463 on the side of the sheet-discharging tray 48. In this state, the conveying rollers 463 are reversely rotated so that the recording sheet is switched back. Then, the recording sheet is sent to a sheet conveying passage L and conveyed again to an upstream area from the recording section 40. After an image is formed on the back side in the recording section 40, the recording sheet is discharged to the stack tray 6 or the sheet-discharging tray 48.

Figure 2:
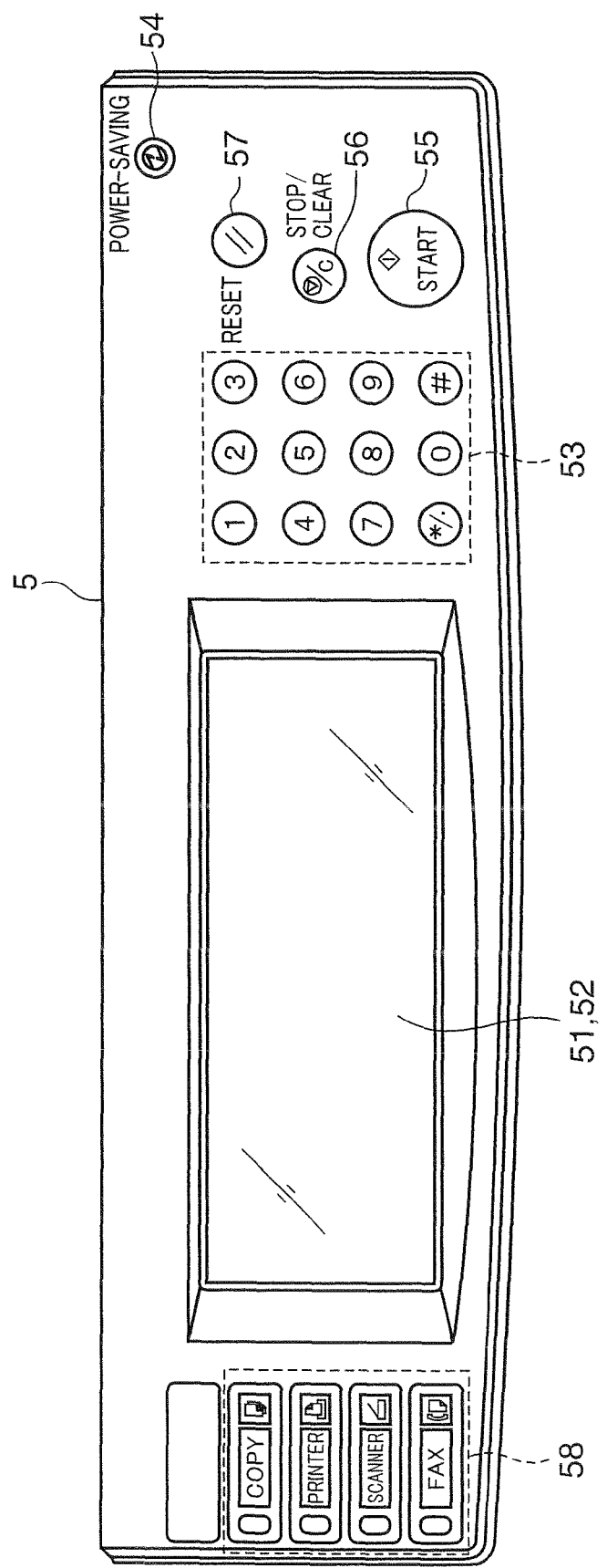
FIG. 2 shows an example of a front view of an operating section.

Further, on a front side of the apparatus main body 3, there is provided an operating section 5 having a display portion which allows a user to visually confirm an operation screen and various massages, and operation buttons for inputting various operation commands. FIG. 2 is an example of a front view of the operating section 5. The operating section 5 includes a display portion 51, a touch panel 52, a numerical key group 53, operation buttons 54-57, function selection buttons 58, and the like. The display portion 51 is configured by an LCD (Liquid Crystal Display), an ELD (Electronic Luminescent Display), or the like and displays guide screens for operations such as a sheet size selection, a magnification selection, a density selection, and the like with respect to a user. The display portion 51 is integrally formed with a touch panel 52. When a user performs a touch operation, the touch panel detects a touched position and outputs a detection signal to the controller which will be described herebelow.

The numerical key group 53 is used for inputting the number of copies at the time of operating the copying function of the complex machine 1, and inputting phone numbers and the like of an addressee at the time of operating the facsimile function. A power-saving button 54 is a button for switching the complex machine 1 to be a power-saving (low-power) mode. A start button 55 is a button for starting the copying operation, the scanner operation, and the like. A stop/clear button 56 is used for stopping the copying operation, scanner operation, and the like, and cancelling the input operation. A reset button 57 is a button for use in displaying of the display portion 51 and changing the various settings to be in an initial state or a default operational state. Function selection buttons 58 are buttons for setting the copying function, the printer function, the scanner function, and the facsimile function.

FIG. 3 is a block diagram showing an electrical configuration of the complex machine 1. The elements which are the same as those shown in FIGS. 1 and 2 are identified by the same reference numerals, and detailed description regarding those will be omitted. The complex machine 1 is configured by the controller 61, the document feeding section 21, the scanner section 23, the CIS 231, the operating section 5, the image processing section 64, the recording section 40, and the communication section 66.

The controller 61 controls an overall operation of the complex machine 1 and is configured by a CPU and the like. The document feeding section 21, the scanner section 23, the CIS 231, the operating section 5, the image processing section 64, the recording section 40, and the communication section 66 are operated under a control executed by the controller 61. The controller 61 executes a processing based on an operation control program stored in an unillustrated ROM or HDD in accordance with various instruction signals inputted to the operating section 5 by a user, outputs the instruction signals to respective functional sections, and performs data transfer to totally control the complex machine 1.

The controller 61 includes a mode setting portion 611, a blank determining portion 612, and a conveyance controller 613. The mode setting portion 611 sets the complex machine 1 to be in the double-sided reverse reading mode or the double-sided simultaneous-reading mode in accordance with an operation inputted by a user to the operating section 5. The controller 61 allows the respective functional sections to be operated in a mode set by the mode setting portion 611.

Herein, in the double-sided reverse reading mode, the scanner section 23 reads a front side of a document. After the sheet-discharging mechanism reverses the document, the scanner section 23 reads a back side of the document. In the double-sided simultaneous-reading mode, the scanner section 23 reads the front side of the document, and the CIS 231 reads the back side of the document in one document conveyance performed by the document feeding section 21.

In a case where the mode setting portion 611 sets the double-sided reverse reading mode, and when the document is conveyed so that one side of the document is read by the scanner section 23, the blank determining portion 612 determines whether the back side is blank in accordance with image data of the document read by the CIS 231 when the document passes through the CIS 231. Herein, the blank determining portion 612 counts the number of dots in an area other than blank in the image data of the document read by the CIS 231, and determines that the document is blank in a case where the count value is smaller than a predetermined value. In a case where the CIS 231 reads the blank document, due to an effect of noises and wastes, it is not necessarily true that all of dots has a pixel value corresponding to the blank, and there exists dots having a pixel value which is not blank. Therefore, the blank determining portion 612 determines as being blank in a case where the number of dots in an area other than successive blanks is smaller than a predetermined value, so as to improve an accuracy in blank determination. As the predetermined value, a value enabling the document to be determined as blank and obtained by experiment is adopted.

After the scanner section 23 reads the front side of the document which is determined by the blank determining portion 612 that the back side is blank, the conveyance controller 613 allows the document to be discharged to the sheet-discharging tray 215 without allowing the sheet-discharging mechanism to reverse the document. Accordingly, the processing in the double-sided reverse reading mode can be made high in speed.

Further, after the front side of the document which is determined by the blank determining portion 612 that the back side is not blank is read by the scanner section 23, and the document is reversed by the sheet-discharging mechanism, and the back side is read by the scanner section 23, the conveyance controller 613 allows the document to be reversed again and discharged to the sheet-discharging tray 215. Accordingly, the document which is determined that the back side is not blank is reversed twice in total and discharged to the sheet-discharging tray 215. On the other hand, the document which is determined that the back side is blank is discharged to the sheet-discharging tray 215 without being reversed. Accordingly, both the documents are discharged to the sheet-discharging tray 215 while their facing directions of front and back sides are matching.

When copying and scanning of the document is performed in the ADF reading mode, the document feeding section 21 automatically takes in the document placed on the document tray 211 and conveys the document so that the CCD 229 and the CIS 231 can read the document.

The display portion 63 displays various images based on display signals inputted from the controller 61.

The image processing section 64 is adapted to perform various image processing related to image data. For example, the image processing section 64 performs correction processing such as a level correction and a gamma correction, a compression or expanding processing with respect to image data, and image processing such as enlarging or reducing processing with respect to image data obtained by the CCD 229 or CIS 231, and image data transferred through a communication section 66 such as a personal computer connected to a network or a facsimile machine connected through a public phone line.

The recording section 40 forms on a recording sheet an image based on image data obtained by the CCD 229 or CIS 231 and image data transferred through the communication section 66 from a personal computer, a facsimile machine, and the like. The recording section 40 outputs a back side of a recording sheet corresponding to the document determined by the blank determining portion 612 that the back side is blank.

The communication section 66 is adapted to perform a transmission of various data between external devices such as a computer and facsimile machine connected through a network by using a network interface.

Next, an operation of the complex machine 1 will be described with reference to the flowchart shown in FIG. 4. Firstly, when a document stack is placed on the document tray 211, and an instruction of starting the document reading is received by the operating section 5 from a user, the document feeding section 21 picks up one document from the document tray 211 and conveys the same to the conveying drum 213. The document stack is placed in such a manner that a front side of each document faces upward with respect to the document tray 211, in other words, placed in a face-up state. In a case where the mode setting portion 611 sets the double-sided reverse reading mode (YES in step S1), the routine proceeds to step S3. On the other hand, in a case where the mode setting portion 611 sets the double-sided simultaneous-reading mode (NO in step S1), the CCD 229 and the CIS 231 reads both sides of the document at a high speed in the double-sided simultaneous-reading mode (step S2), and the recording section 40 forms an image of the document read in the double-sided simultaneous-reading mode onto a recording sheet (step S10).

In step S3, when the document fed by the document feeding section 21 arrives at the reading window 230, the CCD 229 reads the front side of the document. When the document arrives at the CIS 231, the CIS 231 reads the back side of the document.

In step S4, the blank determining portion 612 determines whether the back side of the document is blank in accordance with image data read by the CIS 231. When it is determined that the back side is blank (YES in step S4), the conveyance controller 613 allows the document to be discharged directly to the sheet-discharging tray 215 without controlling the sheet-discharging mechanism to reverse the document (step S7). Since the number of times of reversing is zero, the discharged document is discharged in such a manner that its front side faces down with respect to the sheet-discharging tray 215, in other words, discharged in a face-down state.

On the other hand, in step S4, when it is determined by the blank determining portion 612 that the back side of the document is not blank (NO in step S4), the conveyance controller 613 controls the sheet-discharging mechanism to reverse the document, and controls the document feeding section 21 to convey the document to the reading window 230, so that the back side is read by the CCD 229 (step S5).

In step S6, the conveyance controller 613 controls the sheet-discharging mechanism to reverse the document whose back side is read by the CCD 229, and allows the document to be discharged to the sheet-discharging tray 215, without allowing the CCD 229 to read the document, through the reverse conveying passage 218, the conveying drum 213, the sheet-discharging roller 214, and the sheet-discharging roller 220. Herein, the document is reversed again for the purpose of discharging the document whose back side is not blank to the sheet-discharging tray 215 in a face-down state so that the facing directions of front and back sides align with those of the document discharged in step S7 and having a blank back side. Further, in a case of conveying the document without being read by the CCD 229, the conveyance controller 613 may allow the document to be conveyed at a speed higher than a conveyance speed for the case of reading the document with the CCD 229. In this case, the processing speed in the double-sided reverse reading mode can be made higher.

In step S8, the recording section 40 forms images on both sides of the recording sheet if the back side of the document is not blank. If the back side of the document is blank, the recording section 40 forms an image on the front side of the recording sheet but does not form an image on the back side.

In step S9, in a case where a next document is present on the document tray 211 (YES in step S9), the routine goes back to step S3, and the processing of steps S3-S8 are executed for the next document. On the other hand, in a case where a next document is not present on the document tray 211 (NO in step S9), the processing is terminated. The determination on whether a document is present on the document tray 211 may be performed by providing a document detection sensor (unillustrated) in the document tray 211.

As described above, according to the complex machine 1, in a case where the double-sided reverse reading mode is set, the back side of the document is read by the CIS 231 before the document is reversed by the sheet-discharging mechanism. In a case where it is determined that the back side is blank, the document is discharged to the sheet-discharging tray 215 without being reversed by the sheet-discharging mechanism. Thus, in a case where the back side of the document is blank, the document is discharged to the sheet-discharging tray 215 without being conveyed again to the conveying drum 213. Therefore, the processing becomes higher in speed by that, so that the time loss in the document reading in the double-sided reverse reading mode is reduced, and a high-speed reading can be realized.

Further, after the back side of the document which is determined that the back side is not blank is read by the CCD 229, the document is reversed again and discharged to the sheet-discharging tray 215. Therefore, since the document which is determined that the back side is not blank is reversed twice, the document whose back side is not blank and the document whose back side is blank can be discharged to the sheet-discharging tray 215 in such a manner as to face the same direction.

Second Embodiment

Figure 5:
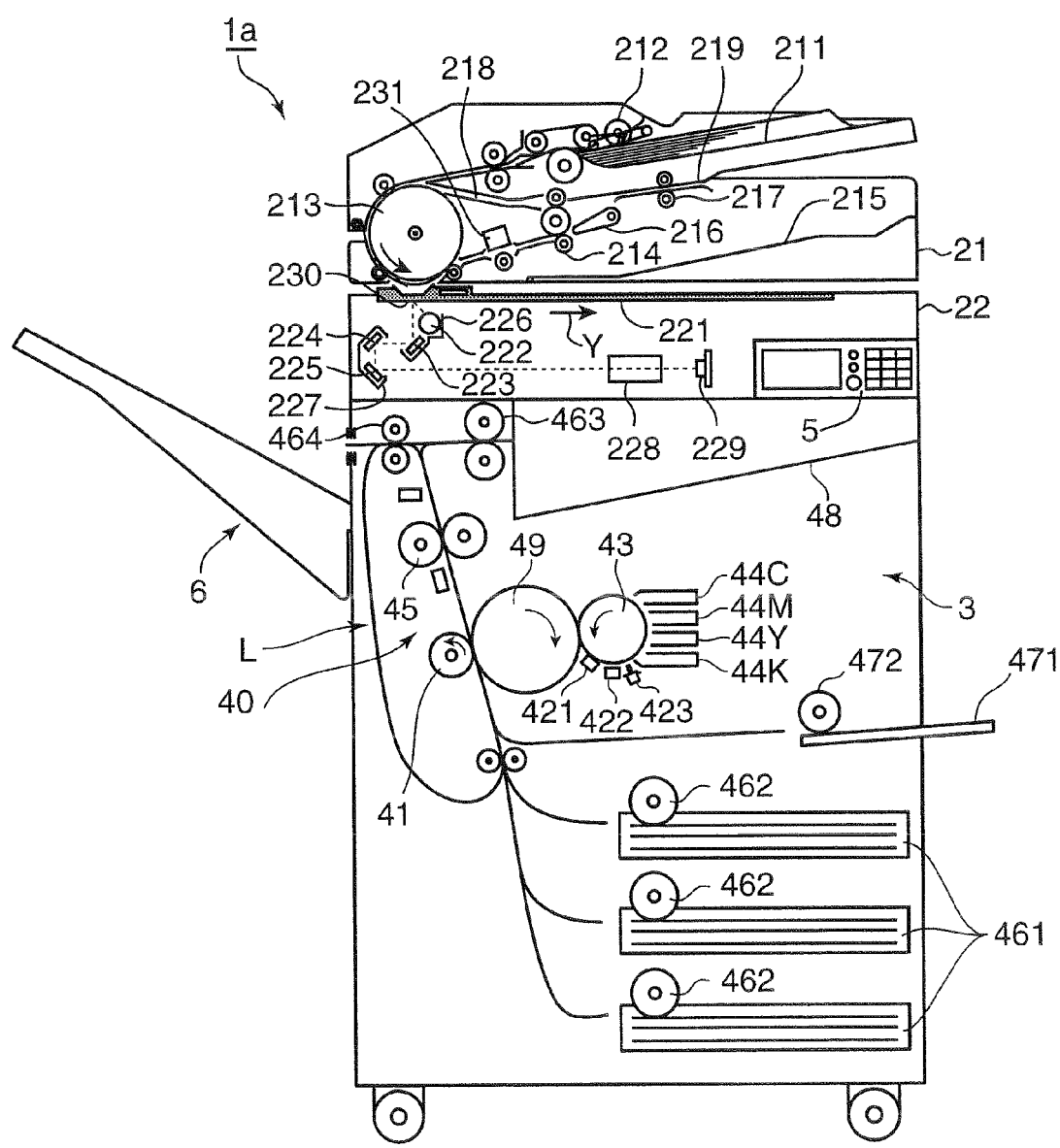
FIG. 5 is a vertical sectional view schematically showing an internal configuration of the complex machine in accordance with a second embodiment.

Next, an image reading apparatus and an image forming apparatus in accordance with a second embodiment of the present invention will be described. In the present embodiment, it is characterized that the reversing mechanism uses an intermediate tray to reverse the document. FIG. 5 is a vertical sectional view schematically showing an internal configuration of a complex machine 1 a as an example of a complex machine in which an image reading apparatus and an image forming apparatus in accordance with the second embodiment are provided together. In the present embodiment, description regarding the components which are the same as those of the first embodiment will be omitted, and only the different items will be described. Further, a block diagram of FIG. 3 will be referred.

As shown in FIG. 5, the complex machine 1a is provided with a reversing mechanism including a switching guide 216, a reversing roller 217, a reverse conveying passage 218, and an intermediate tray 219. At the time of one-sided reading, and after reading a back side at the time of double-sided reading, the switching guide 216 is switched to an upper side, and the document which passed through the conveying drum 213 is discharged by the sheet-discharging roller 214 to the sheet-discharging tray 215.

On the other hand, at the time of the double-sided reading, when a front side of the document is read by the CCD 229, and a leading end of the document arrives before the switching guide 216, the switching guide 216 is switched to a lower side, and the document is conveyed to the intermediate tray 219. Then, when a rear end of the document passes through the switching guide 216, the switching guide 216 is switched to the upper side, so that the document passes through the reverse conveying passage 218 and is conveyed again to the conveying drum 213, and the back side is read by the CCD 229. Then, when the leading end of the document arrives before the switching guide 216, the switching guide 216 is switched to the upper side, so that the document is discharged to the sheet-discharging tray 215.

The blank determining portion 612 shown in FIG. 3, at the time of successively reading the document stack placed on the document tray 211, determines to which of the documents in the document stack corresponds to the document determined that a back side is blank. In accordance with the determination result, the blank determining portion 612 generates blank information indicating to which of the documents in the document stack corresponds to the document determined that a back side is blank, and stores the blank information to an unillustrated memory.

In a case where one or more documents whose back sides are blank are included in the document stack, the blank determining portion 612 allows the display section 63 to display information for notifying a user to place the documents discharged to the sheet-discharging tray 215 to the document tray 211 again.

The conveyance controller 613, regardless of whether the blank determining portion 612 determines that the back side is blank, controls the reversing mechanism to reversely rotate the reversing roller 217 so as to reverse the document front and back, so that the document whose front side is read by the scanner section 23 is conveyed to the intermediate tray 219.

It is preferable that the conveyance controller 613 directly discharge the document which is determined that a back side is blank after obtaining the determination result of whether the back side is blank. On the other hand, in a case where a distance between the CIS 231 and the intermediate tray 219 is shorter than a length of the document in the convey direction, the reversing operation cannot be started unless the determination result of whether the back side is blank. Therefore, in the present embodiment, the conveyance controller 613 reverses the document regardless of whether it is determined by the blank determining portion 612 that the back side is blank.

Further, the conveyance controller 613 controls the document feeding section 21 in such a manner that a back side of the document, which is reversed by the reversing mechanism and determined by the blank determining portion 612 that a back side is blank, is not read by the scanner section 23 and is conveyed at a second speed faster than a first speed to be discharged to the sheet-discharging tray 215. Accordingly, the processing speed in the double-sided reverse reading mode becomes higher. Further, in this case, if the document is placed on the document tray 211 in a face-up state, the document is discharged to the sheet-discharging tray 215 in a face-up state.

Further, the conveyance controller 613 controls the document feeding section 21 in such a manner that the document, which is reversed by the reversing mechanism and determined by the blank determining portion 612 that the back side is not blank, is conveyed at a predetermined first speed which is a conveyance speed at the time of document reading, and a back side of the document is read by the scanner section 23, and thereafter the document is reversed again by the reversing mechanism and discharged to the discharging tray 215. Herein, the document is reversed again after the reading of the back side for the purpose that the document is discharged to the sheet-discharging tray 215 in a face-down state if the document is placed on the document tray 211 in a face-up state.

Further, the conveyance controller 613, in a case where a user places the document stack to the document tray 211 again, controls the document feeding section 21 to sequentially convey the document stack to the document feeding section 21. In a case where the document which is determined by the blank determining portion 612 that a back side is blank is conveyed to the document feeding section 21, the conveyance controller 613 controls the reversing mechanism to reverse the document and discharge the document to the sheet-discharging tray 215.

Further, the conveyance controller 613, in a case where the document which is determined by the blank determining portion 612 that a back side is not blank is conveyed by the document feeding section 21, allows the document to be discharged to the sheet-discharging tray 215 without allowing the reversing mechanism to reverse the document. Herein, the conveyance controller 613 counts up at each time one sheet is conveyed by the document feeding section 21 from the document stack placed again on the document tray 211, and uses the blank information generated by the blank determining portion 612, so as to distinguish the document having a blank back side and a document not having a blank back side.

The display section 63 displays information for notifying a user to place the document stack, which is generated by the blank determining portion 612 and discharged to the sheet-discharging tray 215, again to the document tray 211.

Figure 6:
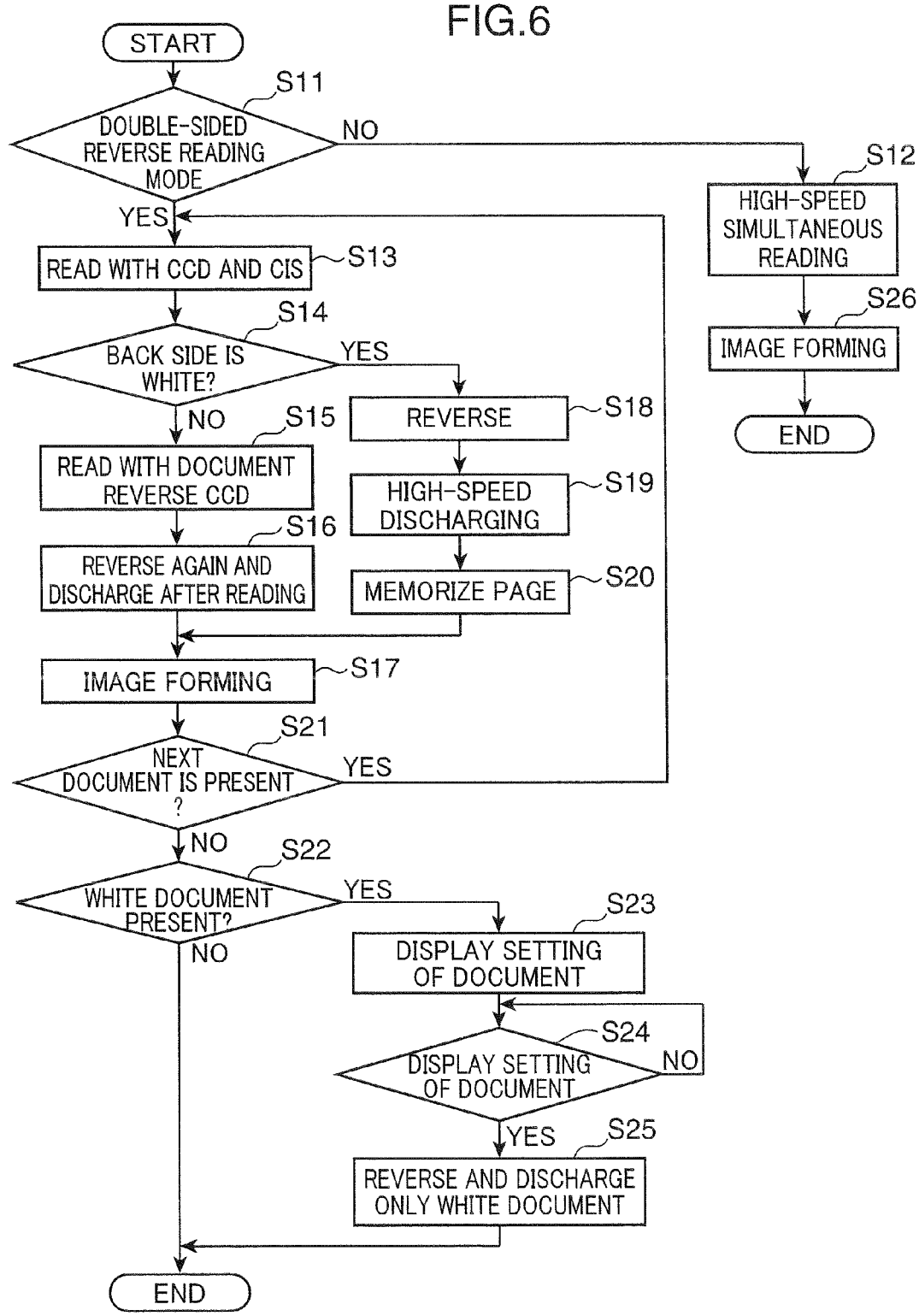
FIG. 6 is a flowchart showing an operation of the complex machine in accordance with the second embodiment.

Next, an operation of the complex machine 1a will be described with reference to the flowchart shown in FIG. 6. In FIG. 6, the document stack is placed on the document tray 211 in a face-up state. Since the processing of steps S11-S17, S26 are the same as those of steps S1-S6, S8, S10 in FIG. 4, description regarding those will be omitted. In step S18, the conveyance controller 613 controls the reversing mechanism to reverse the document which is determined by the blank determining portion 612 that a back side is blank. In step S19, the conveyance controller 613 allows the reversed document to be conveyed at the second speed and discharged at a high speed to the sheet-discharging tray 215 through the reverse conveying passage 218, the conveying drum 213, and the sheet-discharging roller 214.

In step S20, the blank determining portion 612 generates blank information indicating to which of the documents among the document stack to be successively read corresponds to the document determined that a back side is blank, and allows the blank information to be stored in an unillustrated memory. Then, the routine proceeds to step S17.

Figure 4:
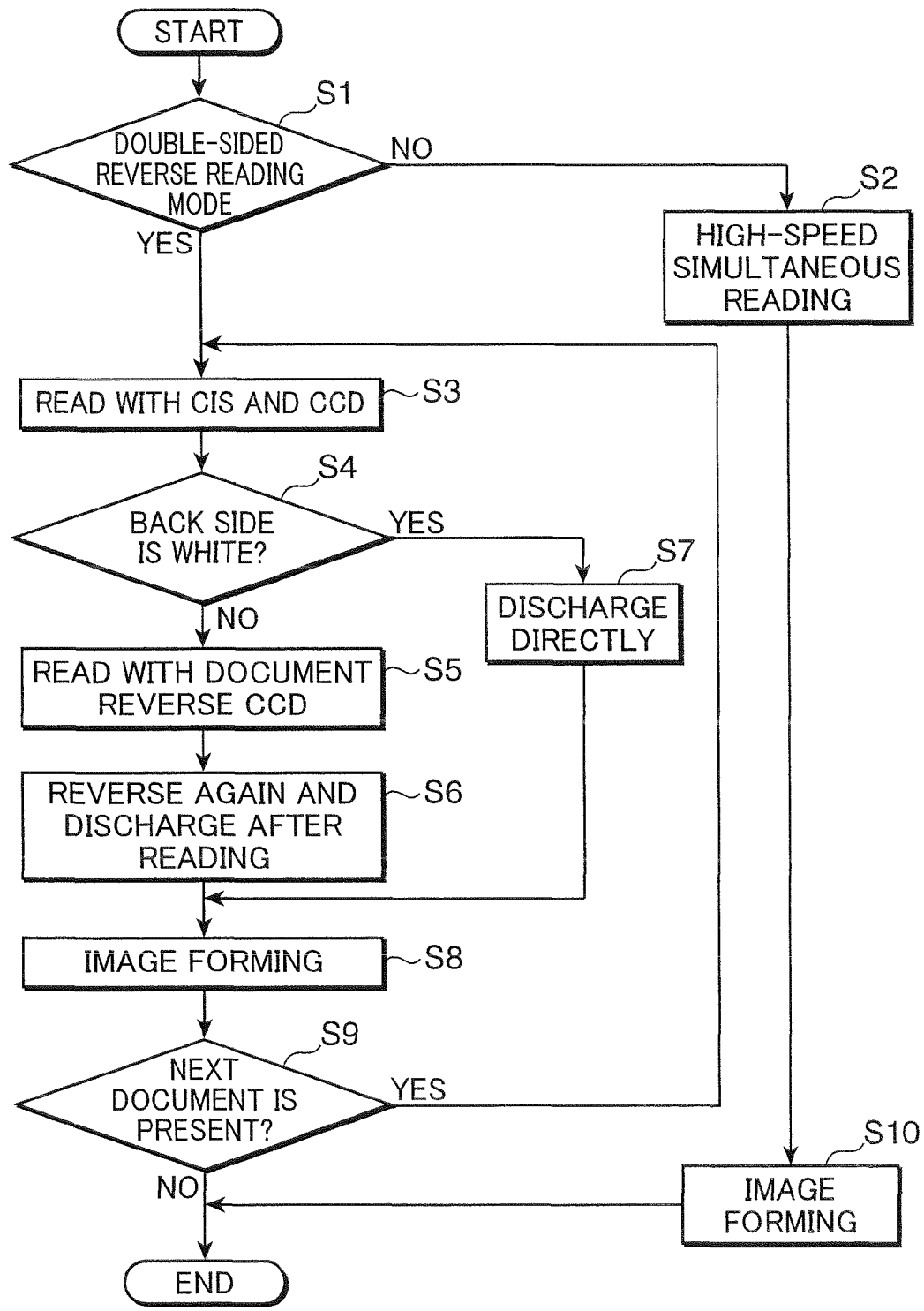
FIG. 4 is a flowchart showing an operation of the complex machine.

Since the processing shown in step S21 is the same as step 9 shown in FIG. 4, description will be omitted. At the time when it is determined NO in step S21, the document whose back side is blank is discharged to the sheet-discharging tray 215 in a face-up state, and the document whose back side is not blank is discharged in a face-down state. In other words, the document whose back side is not blank is reversed twice in steps S15 and S16 and discharged to the sheet-discharging tray 215. However, the document whose back side is blank is reversed once in step S19 and discharged to the sheet-discharging tray 215. Accordingly, facing directions of front and back sides of the document stack on the sheet-discharging tray 215 are not matching. Therefore, the processing of step S22 and subsequent steps match the facing directions of front and back sides of the documents whose back sides are blank and the documents whose back sides are not blank.

In step S22, in a case where one or more documents whose back sides are not blank are included in a document stack (YES in step S22), the blank determining portion 612 allows the display section 63 to display information for notifying a user to place the document discharged to the sheet-discharging tray 215 to the document tray 211 again (step S23).

If the document stack discharged to the sheet-discharging tray 215 is placed onto the document tray 211 again by a user, and the start button is pressed by a user in accordance with this information (YES in step S24), the conveyance controller 613 controls the reversing mechanism to reverse the document whose back side is blank and discharge the document to the sheet-discharging tray 215, in accordance with the blank information generated in step S18. On the other hand, the conveyance controller 613 controls the reversing mechanism to discharge the document whose back side is not blank to the sheet-discharging tray 215 without reversing the document (step S25), and then the processing is terminated.

In step S22, in a case where all back sides of documents constituting the document stack document is not blank (NO in step S22), the processing of steps S23-S25 are not executed, and the processing is terminated.

Accordingly, as a result that the document whose back side is blank is reversed twice, the documents are sorted in such a manner that front and back sides of documents in the document stack discharged to the sheet-discharging tray 215 are matching. In the processing of step S22 and subsequent steps, it is preferable that the conveyance speed of the document is at the second speed. Accordingly, facing directions of front and back sides of the documents constituting the document stack can be matched at a high speed.

As described above, according to the complex machine 1a, in a case where the double-sided reverse reading mode is set, a back side of the document which is determined that a back side is blank is not read by the scanner section 23, and is conveyed at a second speed faster than a first speed which is a conveyance speed at the time of document reading, and is discharged to the sheet-discharging tray 215. Therefore, the processing is executed at a high speed, and the time loss which occurs in the case where the double-sided reverse reading mode is set can be reduced, so that a high-speed reading can be realized.

Further, in a case where the double-sided reverse reading mode is set, regardless of whether the other side is blank, the document whose one side is read by the scanner section 23 is conveyed to the intermediate tray 219 so as to be reversed front and back. Accordingly, in the case where the distance between the CIS 231 and the intermediate tray 219 is short, and the document reversing operation must be started before termination of the determination of whether the back side is blank, a back side of the document whose back side is not blank can be read assuredly by the scanner section 23.

Further, in the case where it is determined which of the document stack corresponds to the document determined that a back side is blank, and the document stack includes the document determined that the back side is blank, it is notified to a user to place the discharged document stack again to the document tray 211. Then, among the document stack placed again on the document tray 211, the document determined that the back side is blank is reversed by the reversing mechanism and discharged to the sheet-discharging tray 215, and the document which is determined that the back side is not blank is not reversed by the reversing mechanism and is discharged to the sheet-discharging tray 215. Thus, the document having a blank back side which is reversed once and discharged, and the document having a blank back side which is reversed twice and discharged can be discharged to the sheet-discharging tray 215 in such a manner that facing directions of front and back sides of the documents match with each other.

The embodiments described above mainly include the invention having the following configurations.

(1) An image reading apparatus according to an aspect of the present invention includes: a document feeding section for conveying a document; a first reading section for reading at least one side of the document conveyed by the document feeding section; a second reading section for reading other side of the document conveyed by the document feeding section; and a blank determining portion for determining whether the other side of the document is blank in accordance with image data of the document read by the second reading section. In a case where the blank determining portion determines that the other side is blank, one side of the document is read by the first reading section, and thereafter the document feeding section discharges the document.

According to this configuration, at the time of conveying the document so as to allow the first reading section to read one side of the document, when the document passes through the second reading section, the second reading section reads the other side of the document. Then, in a case where the blank determining portion determines that the other side is blank in accordance with image data of the document read by the second reading section, the document is discharged without being reversed. Thus, in a case where the other side of the document is blank, the document is discharged without being conveyed again to the first reading section. Therefore, the processing becomes higher in speed, and the time loss which occurs in the document reading in the case where the double-sided reverse reading mode is set can be reduced, so that a high-speed reading can be realized.

(2) It is preferable that the document feeding section reverses a document, which is determined by the blank determining portion that the other side is not blank, and conveys the document again to the first reading section, and after the other side is read by the first reading section, the document feeding section reverses the document again and discharges the same.

According to this configuration, after the other side of the document which is determined that the other side is not blank is read by the first reading section, the document is reversed again and discharged. In other words, the document which is determined that the other side is not blank is reversed twice and discharged. Therefore, the document whose other side is not blank and the document whose other side is blank can be discharged in such a manner that facing directions of the front and back sides of the documents are the same.

(3) The document feeding section, regardless of whether the blank determining portion determines that the other side is blank, reverses front and back of the document whose one side is read by the first reading section, and conveys and discharges the document at a second speed which is faster than the first speed without allowing the first reading section to read the other side of the document which is determined by the blank determining portion that the other side is blank.

According to this configuration, the document whose other side is blank is not read after being reversed, and the document is conveyed to at the second speed faster than the first speed which is a conveyance speed for the document reading and discharged to the sheet discharging section. Therefore, the time loss which occurs in the document reading can be reduced, so that a high-speed reading can be realized.

Further, regardless of whether the other side is blank, the document whose one side is read by the first reading section is reversed front and back. Therefore, even in a case where the distance between the second reading section and the intermediate tray is short, and a document reversing operation must be started before the determination of whether the other side is blank is terminated, the other side of the document whose other side is not blank can be assuredly read by the first reading section.

(4) It is preferable that the document feeding section conveys the document, which is determined by the blank determining portion that the other side is not blank, at the first speed so that the other side is read by the first reading section, and thereafter reverses the document again and discharges the document.

According to this configuration, provided that the other side is the back side of the document, the document whose back side is blank is discharged in such a manner that its front side faces downward.

(5) It is preferable that the blank determining portion, at a time of successively reading a document stack, determines which of the documents in the document stack corresponds to the document determined as having the other side which is blank, and a notifying portion, in a case where the blank determining portion determines that a document having the other side which is blank is included in the document stack, notifies a user to place the discharged document stack onto the document holding portion again, and the document feeding section sequentially conveys the document stack placed again on the document holding portion, and a document which is determined by the blank determining portion as having the other side which is blank is reversed and discharged, and a document which is determined by the blank determining portion as having the other side which is not blank is discharged without being reversed.

According to this configuration, it is determined which of a document in the document stack corresponds to the document which is determined that the other side is blank. Then, in a case where the document which is blank on the other side is included in the document stack, it is notified to a user to place the discharged document onto the document holding portion again. Then, among the document stack placed again on the document holding portion, the document which is determined that the other side is blank is reversed and discharged, and the document which is determined that the other side is not blank is discharged without being reversed.

Thus, the document which is blank on the other side and is reversed once and discharged, and the document which is blank on the other side and reversed twice and discharged, are discharged in such a manner that facing directions of front and back sides are aligned.

(6) It is preferable that the first reading section is configured by a minification optical system image sensor, and the second reading section is configured by a contact-type optical system image sensor.

According to this configuration, since the first reading section used for reading both sides of the document is the minification optical system image sensor, no difference occurs in coloring between image data of one side and image data of the other side in the double-sided reverse reading mode, so that a color image can be read in a high quality. Further, since the second reading section is configured by the contact-type optical system image sensor, more space can be saved as compared to the case where the second reading section is configured by the minification optical system image sensor.

(7) It is preferable that the blank determining portion counts a number of dots in an area which is not blank in image data of a document read by the second reading section, and when the count value is smaller than a predetermined value, the blank determining portion determines that it is blank.

According to this configuration, the second reading section counts the number of dots in an area other than blank in the read image data, and in the case where the count value is smaller than a predetermined value, it is determined as a blank. Therefore, determination of blank can be performed in a highly accurate manner.

(8) It is preferable that there is further provided a mode setting portion of setting one of a double-sided reverse reading mode of allowing the first reading section to read one side of the document and allowing the document feeding section to reverse the document and the first reading section reads the other side of the document, and a double-sided simultaneous-reading mode of allowing the first reading section to read one side of the document and allowing the second reading section to read the other side of the document in one document conveyance by the document feeding section.

According to this configuration, a user can select between the double-sided reverse reading mode and the double-sided simultaneous-reading mode in accordance with use.

(9) An image forming apparatus according to another aspect of the present invention includes the image reading apparatus according to any one of (1)-(8), and an image forming section for forming an image on a recording sheet in accordance with image data read by the document reading apparatus.

(10) The image forming section does not form an image on a back side of a recording sheet corresponding to a document determined by the blank determining portion that the back side is blank.

According to this configuration, in a case where the back side of the document is blank, an image is not formed on a back side of the corresponding recording sheet, so that the back side of the recording sheet can be made blank.

This application is based on Japanese Patent application serial No. 2007-254752 filed in Japan Patent Office on Sep. 28, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus comprising:
   a document feeding section for conveying a document;
   a first reading section for reading at least one side of the document conveyed by the document feeding section;
   a second reading section for reading other side of the document conveyed by the document feeding section;
   a blank determining portion for determining whether the other side of the document is blank in accordance with image data of the document read by the second reading section;
   an intermediate tray to which the document is temporarily discharged;
   a document holding portion on which a document is placed which is conveyed by the document feeding section to the first reading section and the second reading section; and
   a notifying portion, wherein
   in a case where the blank determining portion determines that the other side is blank, one side of the document is read by the first reading section, and thereafter the document feeding section discharges the document,
   the document feeding section, regardless of whether the blank determining portion determines that the other side is blank, conveys the document whose one side is read by the first reading section to the intermediate tray to reverse the document front and back, and discharges the document from the intermediate tray through the first reading section without allowing the first reading section to read the other side of the document which has been determined by the blank determining portion to be blank,
   the document feeding section conveys the document, which is determined by the blank determining portion not to have the other side blank, so that the other side is read by the first reading section, and thereafter reverses the document again and discharges the document from the intermediate tray through the first reading section
   the blank determining portion, at a time of successively reading a document stack, determines which of the documents in the document stack corresponds to the document determined as having the other side blank,
   the notifying portion, in a case where the blank determining portion determines that a document having the other side blank is included in the document stack, notifies a user to place the discharged document stack onto the document holding portion again, and
   the document feeding section sequentially conveys the document stack placed again on the document holding portion, and a document which is determined by the blank determining portion as having the other side which is blank is reversed and discharged, and a document which is determined by the blank determining portion as having the other side which is not blank is discharged without being reversed.

2. The image reading apparatus according to claim 1, wherein
   the document feeding section discharges the document from the intermediate tray through the first reading section at a second speed faster than a first speed which is a conveyance speed for document reading without allowing the first reading section to read the other side of the document which is determined by the blank determining portion that the other side is blank.

3. The image reading apparatus according to claim 1, wherein the document feeding section conveys the document, which is determined by the blank determining portion that the other side is not blank, at the first speed so that the other side is read by the first reading section.

4. The image reading apparatus according to claim 1, wherein the first reading section is configured by a minification optical system image sensor, and
   the second reading section is configured by a contact-type optical system image sensor.

5. The image reading apparatus according to claim 1, wherein the blank determining portion counts a number of dots in an area which is not blank in image data of a document read by the second reading section, and when the count value is smaller than a predetermined value, the blank determining portion determines that it is blank.

6. The image reading apparatus according to claim 1, further comprising a mode setting portion of setting one of a double-sided reverse reading mode of allowing the first reading section to read one side of the document and allowing the document feeding section to reverse the document and the first reading section reads the other side of the document, and a double-sided simultaneous-reading mode of allowing the first reading section to read one side of the document and allowing the second reading section to read the other side of the document in one document conveyance by the document feeding section.

7. An image forming apparatus, comprising:
   an image reading apparatus for reading a document; and
   an image forming section for forming an image on a recording sheet in accordance with image data read by the document reading apparatus, wherein
   the image reading apparatus is configured by the image reading apparatus according to claim 1.

8. The image forming apparatus according to claim 7, wherein the image forming section does not form an image on a back side of a recording sheet corresponding to a document determined by the blank determining portion that the back side is blank.

9. The image forming apparatus according to claim 7, wherein
   the document feeding section discharges the document from the intermediate tray through the first reading section at a second speed faster than a first speed which is a conveyance speed for document reading without allowing the first reading section to read the other side of the document which is determined by the blank determining portion that the other side is blank.

10. The image forming apparatus according to claim 7, wherein the document feeding section conveys the document, which is determined by the blank determining portion that the other side is not blank, at the first speed so that the other side is read by the first reading section.

11. The image forming apparatus according to claim 7, wherein the first reading section is configured by a minification optical system image sensor, and the second reading section is configured by a contact-type optical system image sensor.

12. The image forming apparatus according to claim 7, wherein the blank determining portion counts a number of dots in an area which is not blank in image data of a document read by the second reading section, and when the count value is smaller than a predetermined value, the blank determining portion determines that it is blank.

13. The image forming apparatus according to claim 7, further comprising a mode setting portion of setting one of a double-sided reverse reading mode of allowing the first reading section to read one side of the document and allowing the document feeding section to reverse the document and the first reading section reads the other side of the document, and a double-sided simultaneous-reading mode of allowing the first reading section to read one side of the document and allowing the second reading section to read the other side of the document in one document conveyance by the document feeding section.

* * * * *